(12) United States Patent
Lampert

(10) Patent No.: US 6,579,015 B2
(45) Date of Patent: Jun. 17, 2003

(54) OPTICAL CONNECTOR FERRULE HAVING A MULTIPLE-ANGLED PEDESTAL

(75) Inventor: Norman R. Lampert, Norcross, GA (US)

(73) Assignee: Fitel USA Corporation, Norcross, GA (US)

( * ) Notice: Subject to any disclaimer, the term of this patent is extended or adjusted under 35 U.S.C. 154(b) by 41 days.

(21) Appl. No.: 09/775,103

(22) Filed: Feb. 1, 2001

(65) Prior Publication Data

US 2002/0102067 A1 Aug. 1, 2002

(51) Int. Cl.$^7$ ................................................. G02B 6/36
(52) U.S. Cl. .................................... 385/78; 385/85
(58) Field of Search ........................... 385/59, 60, 61, 385/72, 76, 77, 78, 85

(56) References Cited

U.S. PATENT DOCUMENTS

| | | | | |
|---|---|---|---|---|
| 4,978,193 A | * | 12/1990 | Tomita | ........................ 385/55 |
| 5,459,806 A | * | 10/1995 | Hultermans | ................... 385/66 |
| 6,102,581 A | * | 8/2000 | Deveau et al. | ............... 385/139 |
| 6,135,644 A | * | 10/2000 | Hakogi et al. | ................ 385/58 |
| 6,287,018 B1 | * | 9/2001 | Andrews et al. | ............ 385/139 |

* cited by examiner

Primary Examiner—John D. Lee
Assistant Examiner—Daniel Valencia
(74) Attorney, Agent, or Firm—Thomas, Kayden, Horstemeyer & Risley, LLP

(57) ABSTRACT

An optical fiber connector ferrule blank has, at its distal end, a pedestal region which has a bevel within a carefully chosen range of angles and a second bevel or chamfer which extends from the end of the first bevel at a different range of angles. The combination of first and second bevels makes possible a finished ferrule that can be used in a variety of different connectors while satisfying the manufacturer's requirement for pedestal diameter, angle of the second bevel, and the length of the combined bevels.

6 Claims, 6 Drawing Sheets

| Blank No. | FERRULE TYPE | Angle, Range | Pedestal Dia., Range | Chamfer Length Range | Pedestal Area Change, Big-small |
|---|---|---|---|---|---|
| units | | degrees | mm | mm | (mm)² |
| 17 | LC | 35 - 25 = 10 | 1.0 - 0.8 = 0.2 | 0.48 - 0.18 = 0.3 | 0.283 |
| 11 | Invention | 40 - 45 = 5 | 0.85 - 0.6 = 0.25 | 0.48 - 0.37 = 0.11 | 0.285 |
| new no. | Proposed IEC for LC | 37.5 - 32.5 = 5 | 0.85 - 0.6 = 0.25 | 0.51 - 0.26 = 0.25 | 0.285 |
| 18 | MU | 40 - 45 = 5 | 0.73 - 0.45 = 0.28 | 0.48 - 0.26 = 0.22 | 0.285 |

TABLE A. Ferrule Comparisons

OPTICAL CONNECTOR FERRULE HAVING A MULTIPLE-ANGLED PEDESTAL

FIELD OF THE INVENTION

This invention relates to optical fiber connectors for use in optical communication systems and, more particularly, to a ferrule blank for making ferrules for use in such connectors.

BACKGROUND OF THE INVENTION

In optical fiber communications arrangements, there has been a steadily increasing improvement in the reduction of signal loss within the fiber itself, but fiber signal loss is the major contributing factor to signal loss in long distance system which can be compensated for by the use of fiber amplifiers. An additional critical loss factor is the quality of the coupling when two signal bearing fibers are connected together, inasmuch as the junction between the two fibers represents a discontinuity where signal losses can, and do occur.

In general, fibers are connected together in end-to-end, butting relationship by means of connectors having fiber holding ferrules therein. It is common practice to finish the end of each ferrule in a generally flat surface normal to the axis of the fiber whereby the flat faces of the two ferrules involved in a connection bear against each other, and hence, the fiber ends abut, often with an index matching gel therebetween.

The present state of the art is such that, for various reasons, there exists a large number of connectors, or ferrule containing connector plugs, which differ from each other in one or more particulars, including the configuration of the fiber holding ferrule. Such a plethora of differing connector plugs makes it difficult to standardize connectors and their ferrules, thus requiring custom made ferrules that fit a particular connector but seldom meet the requirements of other connectors. For example, mating ferrules are generally inserted into alignment sleeves which are most often zirconia or metallic, and their pedestals abut each other within the sleeve. The term pedestal refers to that portion of the distal end of the ferrule that is polished for optimum mating with the abutting ferrule of the connector plug with which it forms a connection and includes angular bevels or chamfers. Most often, in the present state of the art, the end faces appear flat and parallel, but in most cases, the distal ends of the ferrules are domed by 7 to 25 mm, requiring, as an optimum, that the apex of the dome and the optical axis of the fiber contained within the ferrule coincide, an extremely difficult configuration to achieve. It has been found that an apex offset of something less than 50 $\mu$m is acceptable. It has been proposed that the ferrule blank be made with a tapered distal end to produce a small diameter pedestal which may be ground with either a flat or domed configuration. Where the ground and polished end is flat the angle of the bevel or taper is preferably small so as to produce a relatively large pedestal, whereas when the distal end is to be domed, or, in some connectors, flat, the angle is large, resulting in a small surface area pedestal. Such a small area is difficult to polish with precision inasmuch as it tends to tear the polishing cloth or paper because of the high pounds-per-square inch forces thereon. On the other hand, a large bevel angle functions to guide the ferrules into the alignment sleeve without damaging it, whereas a shallow angle is less efficient as a guide and the ferrule is sometimes scraped as it enters the sleeve, resulting in damage to the ferrule or, possibly, the sleeve or sleeve holder. Too shallow an angle can also lead to problems of instability where too much of the length of the ferrule is tapered and not enough thereof is a slip fit within the alignment sleeve. As a consequence of the foregoing, the conflict between taper or bevel angles has forestalled efforts to standardize the ferrule blank. For example, a proposed ferrule blank having a bevel angle that represents a compromise between large and small angles has been submitted to the International Electrotechnical Commission (IEC), but has met with objections by connector manufactures and users, and thus has not yet been universally accepted for all SFFC (Small Form Factor Connectors).

Among the most widely used connectors are the LC type and the Mu type, but the dimensions of their ferrules, more particular, the pedestal dimensions, are so different that arriving at a standardized ferrule blank is seemingly a hopeless proposition, even for new SFFC designs such as the LX.5 by ADC and the F3000 by Diamond. For a variety of reasons, however, a standardized ferrule blank is greatly to be desired.

SUMMARY OF THE INVENTION

The present invention is a ferrule blank which can be adapted for use in a wide variety of differently configured connectors, and thus is amenable to standardization. Most particularly, the ferrule blank of the invention is usable with both the LC type and MU type connectors, as well as many other types of connectors.

The ferrule blank of the present invention has, at its distal, or pedestal, end a first bevel angle of approximately thirty degrees (30°) extending from the outer diameter of the ferrule, which is approximately 1.25 mm to a point where the diameter of the ferrule is approximately 0.90 mm, and a second bevel of forty to forty-five degrees (40°–45°) is formed which extends to the pedestal end. The ferrule blank has a diameter in the range of 0.60 mm to 0.75 mm approximately before polishing and a diameter in the range of 0.600 mm to 0.850 mm approximately after polishing. This equates to a total ferrule chamfer length of approximately 0.452 mm to 0.377 mm for a combined 30° and 45° angle prior to polishing, and approximately 0.452 mm to 0.327 mm after polishing. As will be apparent hereinafter, the ferrule of the invention, dimensioned as set forth in the foregoing, can be used, after appropriate grinding, with a wide variety of connector plugs from LC to Mu as extremes. There is no necessity for custom designing a ferrule for any of numerous connectors inasmuch as the operation of grinding the pedestal creates a butting surface at the distal end of a desired diameter and a ferrule end configured to fit most of the connector adapters containing an alignment sleeve.

Some manufacturers insist upon a forty to forty-five degree bevel angle for insuring proper guidance of the ferrule into the sleeve and which provides a relatively small bevel length, thereby insuring stability of the ferrule within the sleeve. However, as will be pointed out hereinafter, the pedestal diameter is relatively quite small, with the inherent disadvantage thereof. The second bevel (or chamfer) angle of the ferrule of the present invention substantially meets these requirements for guidance and stability even after grinding, as will be shown, and advantageously results in, after grinding, a greater pedestal diameter. Other manufacturers prefer a shallower bevel angle so as to produce a large diameter pedestal, and thus their ferrules are incompatible with the first group, and still other manufacturers seek a compromise between the two extremes. In virtually all cases, the ferrule blank of the present invention makes possible, with appropriate grinding, a finished ferrule that can satisfy the requirements of most manufacturers, thus eliminating the customized ferrule blank configuration by standardizing the ferrule blank configuration.

The principles and features of the present invention will be more readily apparent from the following detailed description, read in conjunction with the drawings.

DETAILED DESCRIPTION

Figure 1:
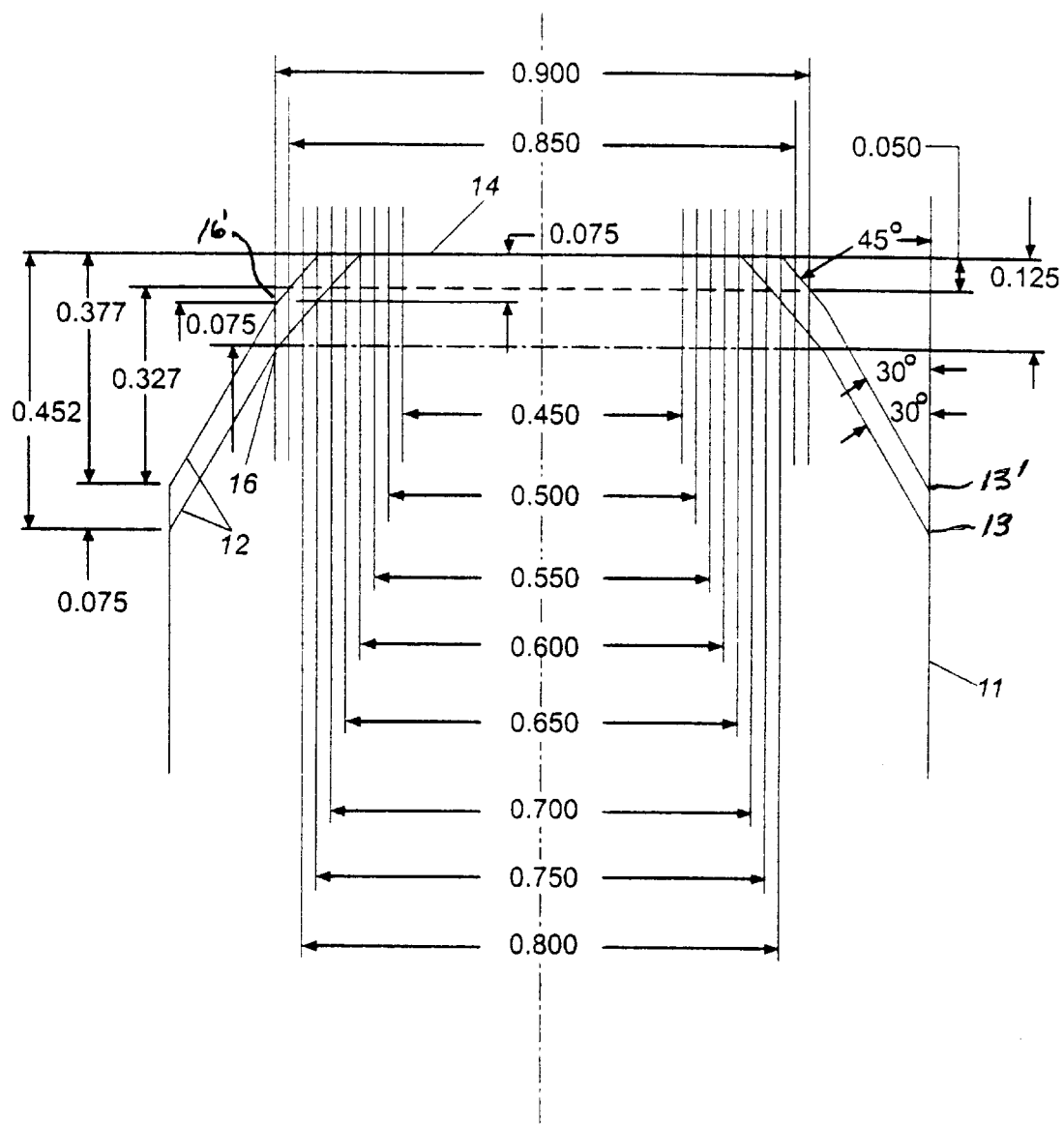
FIG. 1 is an elevation view of the distal end of the ferrule blank of the present invention, illustrating the various dimensioned ranges thereof.

FIG. 1 depicts the distal or pedestal end of the ferrule blank 11 of the present invention dimensioned for both pre- and post-grinding to produce the desired finished ferrule configuration. Post-grinding is typically applied after insertion of the signal transmission fiber, and this operation is also referred to as polishing. While the present invention exposition deals with ferrules having pedestals that are ground flat as shown in FIG. 1, it is to be understood that the principles of the invention are applicable to pedestals other than flat, such as, for example, domed or convex pedestals. It is further to be understood that the ferrule blank 11 has a longitudinal bore extending axially therethrough into which the optical fiber is inserted and affixed. For simplicity, the bore has not been shown in any of the several views.

Ferrule blank 11 has a first taper or bevel 12 of approximately 30° beginning at a point 13 or 13' on the ferrule outer diameter that is respectively 0.452 mm to 0.377 mm from the pedestal end 14 and extends to a point 16 or 16' where the diameter of the ferrule 11 is approximately 0.900 mm. For the points 13 to 16, this is a longitudinal distance of approximately 0.302 mm where the bevel angle is 30° and for the points 13' to 16' it is also a longitudinal distance of approximately 0.302 mm for a bevel angle of 30°. For simplicity, FIG. 1 shows an angle of 30°, and a typical range thereof is 25° to 30°.

From point 16 to the bevel end 14 the angle of the bevel (or chamfer) is, in the ferrule blank of FIG. 1, 45°, producing a pedestal diameter at end 14 of approximately 0.600 mm at the other pedestal diameter extreme prior to polishing, i.e., from the point 16' to end 14 a bevel angle of 45° yields a pedestal diameter of approximately 0.750. The longitudinal dimensions given in FIG. 1 will vary with variations in the first chamfer or bevel angle, which is within the range of 25° to 30° and the second chamfer angle, which is within the range of 40° to 45°, however, the diameters remain substantially the same.

The combined lengths of the bevels is relatively short so that when the ferrule is inserted within the sleeve in the connector, the stability thereof is unimpaired.

Figure 2A:
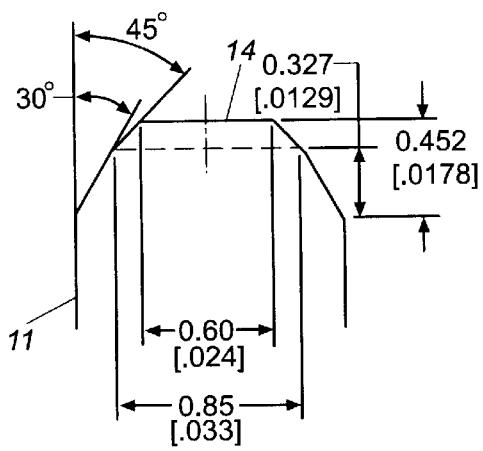
FIG. 2a is an elevation view of the distal (or pedestal) end of one embodiment of the present invention, before (smallest pedestal) and after polishing.
Figure 2B:
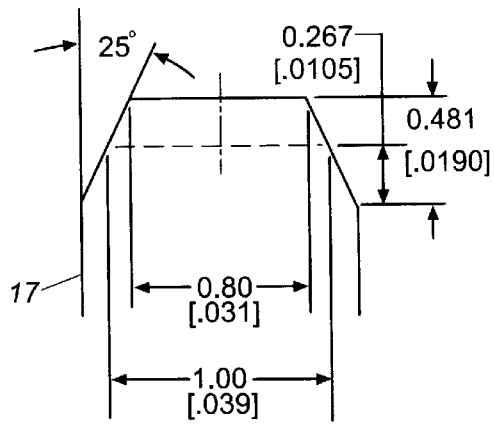
FIG. 2b is an elevation view of the distal end of the ferrule blank of an LC type connector.
Figure 2C:
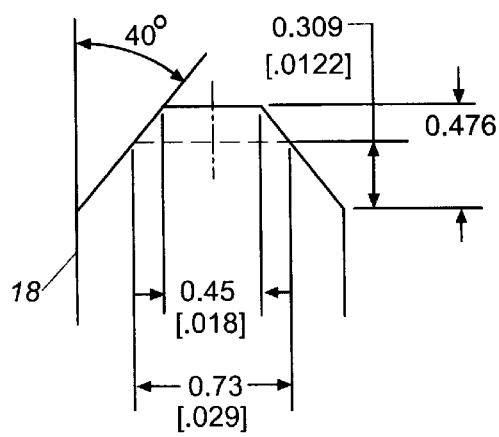
FIG. 2c is an elevation view of the distal end of the ferrule blank of a Mu type connector.
Figure 3A:
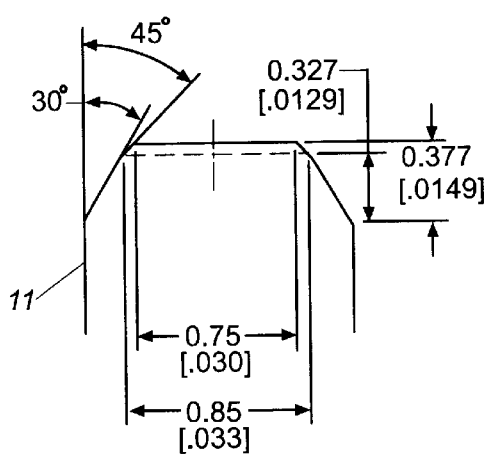
FIG. 3a is an elevation view of the distal end of the ferrule of FIG. 2a with the largest pedestal before and after polishing.
Figure 3B:
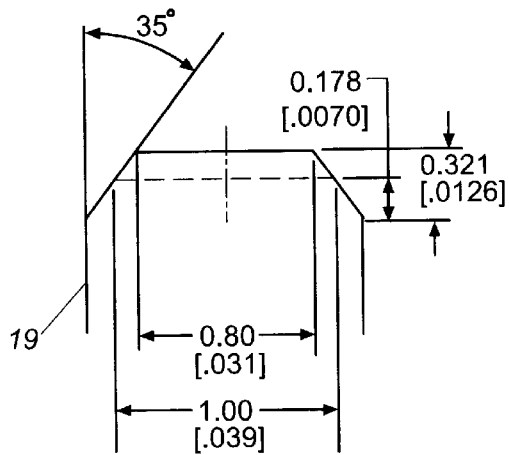
FIG. 3b is an elevation view of the distal end of a different LC ferrule blank.
Figure 3C:
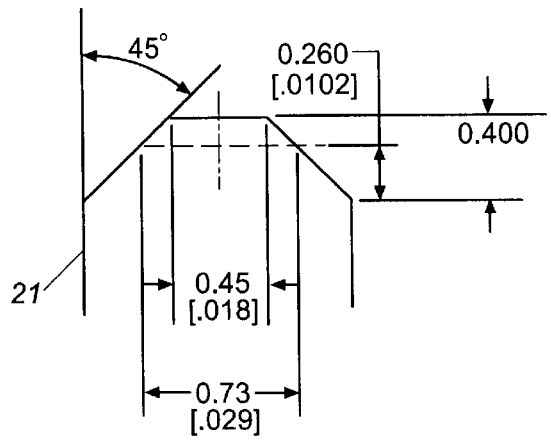
FIG. 3c is an elevation view of the distal end of a different Mu ferrule.

In FIGS. 2a, 2b, and 2c, the ferrule blank 11 of the invention, FIG. 2a, is compared to the blank 17 for an LC type connector (FIG. 2b) and to the blank 18 for an Mu type connector (FIG. 2c). As shown in FIG. 2a, the pedestal end 14 of ferrule blank 11 can be ground to the dashed line to produce a maximum allowable pedestal diameter of 0.85 mm. At the other extreme, when the maximum 0.75 mm diameter pedestal of the ferrule blank 11 is polished to 0.85 mm, the 45° chamfer is almost eliminated, as best seen in FIG. 3a, which is of importance, especially for the MU type connector, as discussed hereinbefore. The LC ferrule 17 of FIG. 2b is shown with a 25° bevel which, when the pedestal is ground to the dashed line, produces a pedestal diameter of 1.00 mm. For a 35° bevel on LC ferrule 19 shown in FIG. 3b, the depth of grinding to produce a 1.00 mm pedestal diameter is much less. The MU type ferrule 18 shown in FIG. 2c has a 40° bevel which produces a pedestal diameter of 0.73 mm when ground to the dashed line. When the bevel angle is 45°, as shown on MU ferrule 21 in FIG. 3c, less grinding is required to produce a pedestal diameter of 0.73 mm. It can be seen that the ferrule 11 of FIG. 3b can be used in both an LC type connector and, where the 45° chamfer is retained, in a MU type connector.

Figure 4:
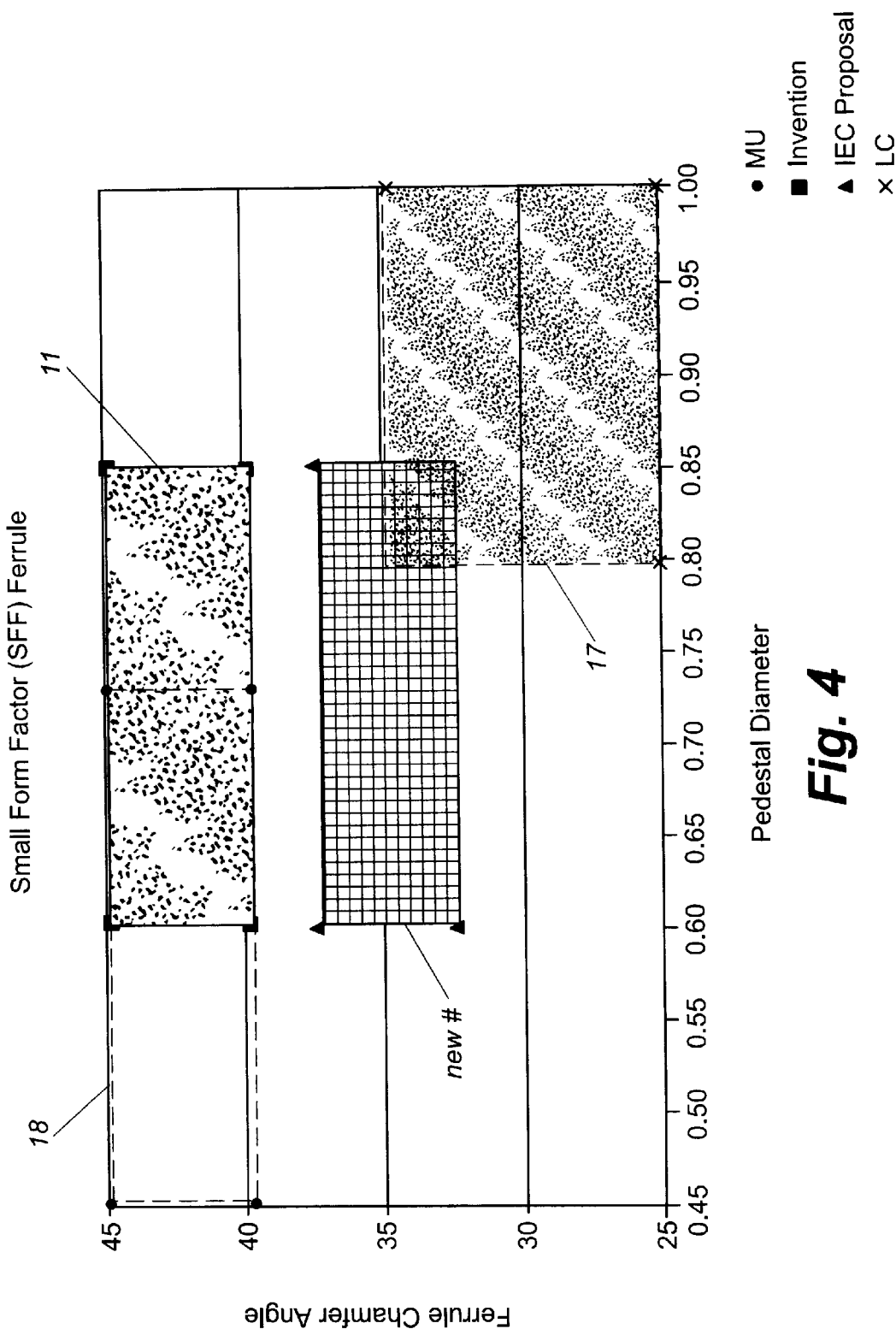
FIG. 4 is a chart showing the compatibility of the ferrule of the present invention with both a Mu type and an LC type connector.

The versatility of the ferrule blank of the invention is illustrated in the table of FIG. 4, which is a modified bar chart of chamfer (or bevel) angle versus pedestal diameter for the MU type connector ferrule 18, the LC type connector ferrule 17, the IEC proposed LC compromise ferrule and the ferrule 11 of the invention. To the extent that there is dimensional overlap of the bar representing the ferrule 11 of the invention with either the bar representing the Mu connector ferrule 18 or the bar representing the ferrule 17 of the LC connector, the ferrule blank of the invention is usable therewith. For example, in FIG. 4 it can be seen that the Mu ferrule 18 (the bar is labeled with the ferrule member) may have a chamfer (or bevel) angle within the range of 40° to 45°, and a pedestal diameter within the range of 0.45 mm to 0.73 mm, while the ferrule 11 of the invention has a bevel angle near the pedestal within the range of 40° to 45° and a pedestal diameter of 0.6 mm to 0.85 mm. For simplicity, the 30° bevel of the ferrule 11 has not been shown, but, in order to be compatible with the MU type connector longitudinal chamfer length, it is, as pointed out hereinbefore, present. However, also as previously discussed, when the pedestal diameter reaches 0.85 mm, the second bevel is close to being eliminated. Hence, where the second bevel is needed, the pedestal diameter should be less than 0.85 mm. From FIG. 4 it can also be seen that the ferrule of the invention is usable with an LC type connector and with an IEC standard LC type ferrule proposed but not uniformly adopted by all SFFC because the chamfer angle nearest the pedestal is not 40° to 45°, and to bevel or chamfer angle is from 32.5° to 35°. These values are included in the numerical tabulation in Table A. Note that the ferrule blank of the invention also maintains the tightest chamfer length, range, yet all four of the ferrule types will have a similar pedestal area from the largest pedestal diameter.

From the foregoing, it can be seen that the ferrule blank 11 of the invention, having first and second bevels or chamfers, is compatible with a large number of connector types. More particularly, it is compatible with the Mu and LE types of connectors, as borne out in FIGS. 2, 3, and 4. Such a standardized ferrule blank has numerous benefits, not the least of which is the obvious economic benefit.

Figure 5:
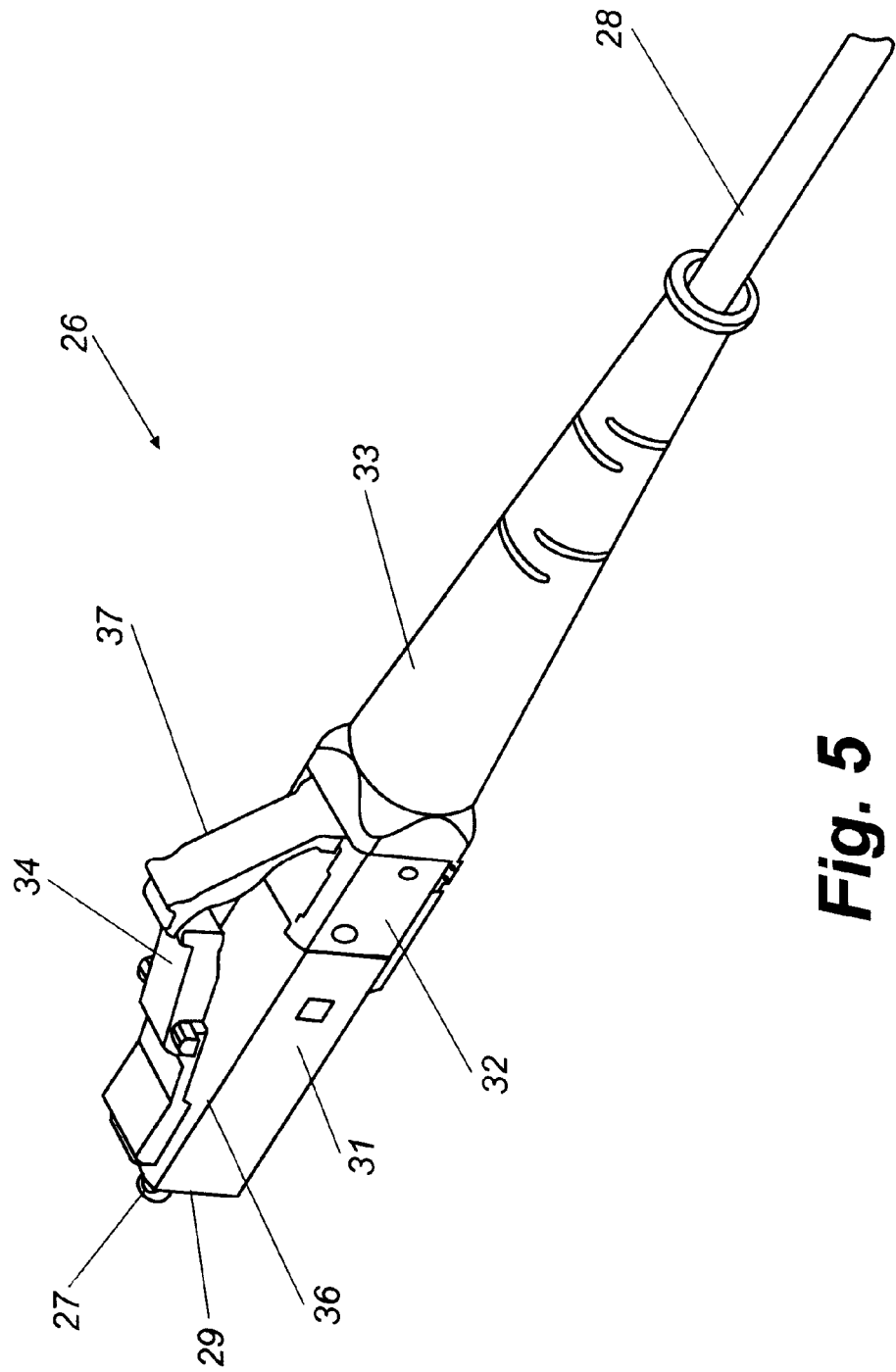
FIG. 5 is a perspective view of a connector having a ferrule having first and second bevel angles in accordance with the principles of the present invention.

In FIG. 5 there is shown an assembled connector 26 having a multi-angled ferrule 27 in accordance with the principles of the present invention. For illustration purposes, connector 26 is shown as an LC type connector, but it is to be understood that, as explained in the foregoing, the multi-angled ferrule of the invention is useful in a number of different connector types.

Connector 26 serves as a termination for an optical fiber cable 28 entering the connector at the cable end thereof, and comprises, in addition to ferrule 27 (which has an optical fiber in the bore thereof) which extends from the connector end of the connector 26, a housing 29, a cover 31, and an end member 32, which together make up the connector body. A bend limiting boot 33 encircles the cable 28 and is attached to the connector body. A cantilevered latching arm 34 is mounted on housing 29 by means of a "living hinge 36 and a trigger member 37 is mounted on end member 32 for facilitating actuation of arm 34 in a manner known in the art.

It is to be understood that the various features of the present invention might be incorporated into other types of ferrules, and that other modifications or adaptations might occur to workers in the art. All such variations and modifications are intended to be included herein as being within the scope of the present invention as set forth. Further, in the claims herein, the corresponding structures, materials, arts and equivalents of all means or step-plus-function elements are intended to include any structure, material, or acts for performing the functions in combination with other elements as specifically claimed.

What is claimed is:

1. A ferrule blank for use in an optical fiber connector, said blank comprising:

an elongated cylindrical member having a distal end;

a first circumferential bevel having a first bevel angle extending from a first point on said member toward the distal end thereof for creating a first conical portion of said member to a second point on said member intermediate the first point and said distal end;

a second circumferential bevel having a second bevel angle extending from said second point to said distal end creating a second different conical portion of said member;

said second bevel angle being greater than said first bevel angle to produce a distal end diameter of from approximately 0.600 mm to 0.750 mm.

2. A ferrule blank as claimed in claim 1 wherein said first bevel angle is from approximately twenty-five degrees (25°) to thirty degrees (30°).

3. A ferrule blank as claimed in claim 1 wherein said second bevel angle is from approximately forty degrees to forty-five degrees (40°–45°).

4. A ferrule blank as claimed in claim 1 wherein said first point is from approximately 0.38 mm to 0.48 mm from said distal end.

5. A ferrule blank as claimed in claim 1 wherein said second point is from approximately 0.075 mm to 0.150 mm from said distal end.

6. A ferrule blank for use in an optical fiber connector, the ferrule of which has a predetermined pedestal diameter formed by grinding and polishing a distal end of said blank, said blank comprising:

an elongated cylindrical member having a distal end upon which the pedestal is formed;

a first circumferential bevel having a first bevel angle extending from a first point on said member toward the distal end thereof:

a second circumferential bevel having a second bevel angle extending from a second point intermediate said first point and said distal end, said second bevel angle being greater than said first bevel angle and defining with said first circumferential bevel a two step chamfer having a pedestal formed thereon having a diameter of from approximately 0.600 mm to 0.85 mm.

* * * * *